Feb. 13, 1934.  N. E. LEMMON ET AL  1,946,748
REVIVIFYING FILTER CLAY
Filed June 13, 1932
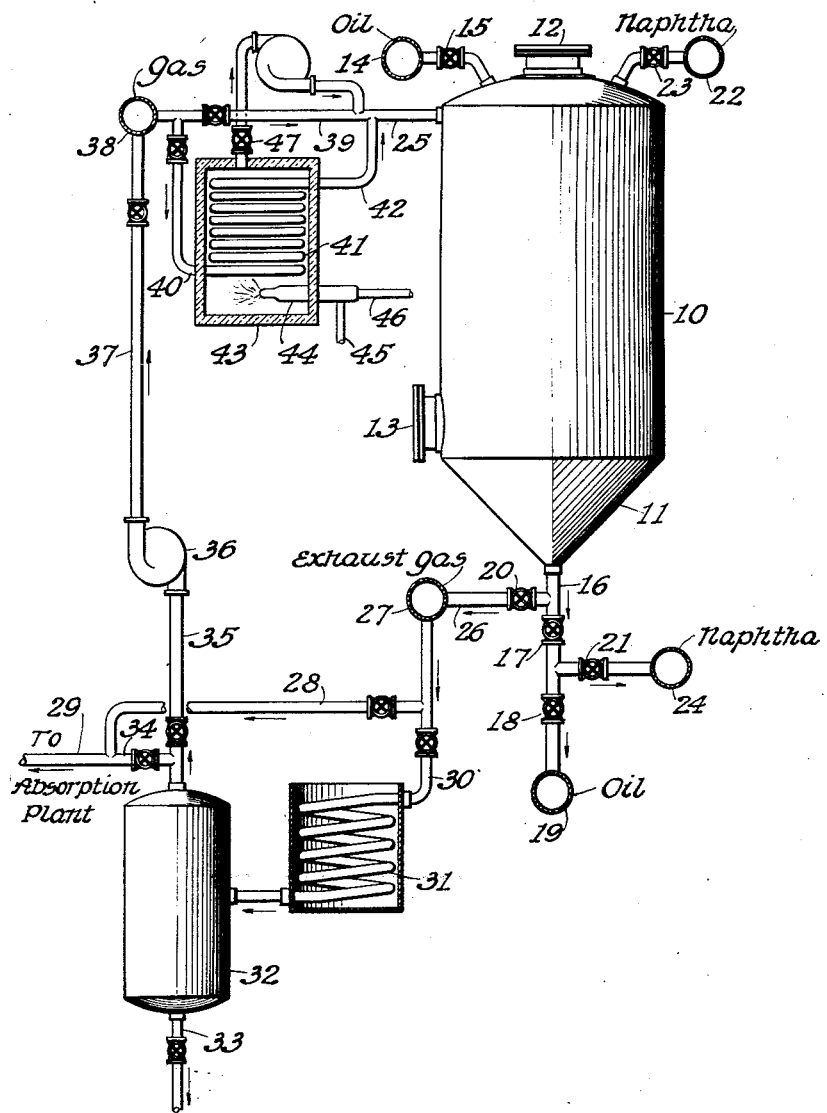
INVENTORS
Norman E. Lemmon
Arthur B. Brown
By Donald E. Payne
ATTORNEY Patented Feb. 13, 1934

1,946,748

UNITED STATES PATENT OFFICE 1,946,748

REVIVIFYING FILTER CLAY

Norman E. Lemmon and Arthur B. Brown, Hammond, Ind., assignors to Standard Oil Company, Chicago, Ill., a corporation of Indiana Application June 13, 1932. Serial No. 616,953

6 Claims. (Cl. 252—2)

This invention relates to the washing and revivification of filter clay and it pertains more particularly to an improved method and means for recovering the washing fluid used without impairing the decolorizing value of the recovered clay.

In the refining of petroleum oils, particularly lubricating oils, it is common practice to percolate said oils through a bed of color adsorbent clay, such as fuller's earth. The clay particles are preferably graded to size, passing a 30 and retained on a 60 mesh screen. Physically, the clay particles are characterized by high porosity and the presence of enormous surface areas and innumerable interstices. The clay has the peculiar faculty of removing color bodies, soaps and other undesirable constituents and/or impurities from the oil, but it becomes clogged in time with these impurities and must be revivified and renewed.

As commonly practiced, when the efficiency of the clay is substantially lost, the adhering oil is washed out of the filter and clay with a light solvent, such as naphtha, benzol or other light organic solvent. After this washing step it is necessary to remove the solvent from the clay and restore the clay, usually by igniting it to regenerate its color adsorbing activity or by treating it with acetone or similar solvents.

Heretofore, wash naphtha has been removed from the clay by steaming prior to the burning step. We have discovered that water and steam exert a deleterious effect on percolation clay and that a clay which has been steamed will not have the long life nor the activity of a clay which has not been steamed. We cannot explain just how or why this should be but it may be that the steam has a disruptive effect on the clay granules, causing them to disintegrate to fine material which must be discarded after each reburning. It may be that the aqueous fluid exerts some chemical effect on the active surfaces of the clay or that the resulting clay is wet with water and thereby disintegrates in the subsequent burning operation. At any rate, the life and activity of the filter may be materially increased by using the revivification method hereinafter described.

We have discovered that improved revivification may be accomplished by washing the clay with an organic solvent and drying the clay with an inert hydrocarbon gas prior to the reburning step. This process has a further advantage of conserving the adsorbed material and the wash liquid, at least a part of which might otherwise be lost.

In the accompanying drawing we have diagrammatically shown a plan or flow sheet of our improved system.

The percolation filter may consist of a closed cylindrical chamber 10 provided with a hopper bottom 11. The clay particles may be suspended upon a suitable screen or filter element and the clay may be in one large body or it may be positioned on spaced trays. The particular arrangement of the filter forms no part of this invention and it will not be described in detail.

The clay may be charged into the filter through manhole 12 and the spent clay may be removed through manhole 13. Oil from pipe 14 is introduced in amounts regulated by valve 15 into the top of the filter chamber and the purified oil is withdrawn from the base of the hopper bottom through pipe 16, valves 17 and 18, and pipe 19, valves 20 and 21 being closed. After the filter has been used for a certain period of time (which will depend on the nature of the oil undergoing treatment) its loses its effectiveness and fails to remove the soaps, color bodies and impurities to the required degree. At this time valves 15 and 18 are closed and a wash liquid, preferably naphtha, is introduced from pipe 22 through valve 23 into the top of the chamber, said wash liquid and removed impurities being withdrawn through pipe 16, valves 17 and 21, and pipe 24 to a suitable storage tank. This material may be used as a liquid fuel or it may be redistilled and/or further refined to recover the wash liquid and/or the removed substances.

After the filter has been thoroughly washed valves 23 and 17 are closed and a dry, inert gas is introduced through pipe 25. This gas is preferably at an elevated temperature, about 220–400° F., and as it sweeps through the filter it removes all the wash liquid and leaves the clay in condition for burning. This gas is passed through pipe 26 to exhaust main 27 and thence through pipe 28 to wet gas line 29 or through pipe 30 and condenser 31 to gas liquid separator 32, the liquid being withdrawn from the bottom thereof through pipe 33. The gas from the top of the separator may be passed by pipe 34 to the wet gas line and absorption plant, or it may be passed by pipe 35, blower 36 and pipe 37 to high pressure gas main 38. From gas main 38 it may pass through pipes 39 and 25 directly to the top of the filter chamber or it may be passed through pipe 40, heater 41, pipe 42 and pipe 25 thereto. Heater 41 may be positioned in a furnace 43 over gas burner 44 which is supplied with air from pipe 45 and with gas from pipe 46.

We prefer to circulate so-called "high line" or "dry" refinery gas through the filter,—this gas being a mixture of methane, ethane, hydrogen, etc. with practically no condensible hydrocarbons. After passing through the filter this gas is introduced into the wet gas line 29 which leads to the absorption plant wherein condensibles and/or fractions suitable for use as liquid fuels are recovered. Instead of using refinery high line gas for sweeping the wash liquid from the filter we may employ combustion products from one or more refinery stills or even from the furnace 43. Instead of taking the combustion gases to a stack, we may pass them through pipe 47 to pipe 39 and mix them therein with the recirculated gases. It is undesirable to have oxygen in these gases and we therefore burn the fuel in the presence of an excess of gas. For most purposes, however, we prefer to use refinery high line gas and the furnace 43 is merely an example of a means for heating said gas to a required degree, usually about 220–400° F.

After the clay has been thoroughly dried it may be reburned by conventional means and reused for treating further amounts of oil, or it may be extracted with a suitable solvent for the gums and resins which have been absorbed by it.

While we have disclosed in detail a preferred embodiment of our invention it should be understood that we do not limit ourselves to the above details except as defined by the following claims which should be construed as broadly as the prior art will permit.

We claim:

1. The process of regenerating spent filter clay, comprising washing the clay with an organic solvent to remove the adhering oil, sweeping the clay with an inert water-free gas to remove said solvent therefrom and leave the clay in a dry, water-free condition, and subsequently igniting the clay to destroy and remove adhering organic material.

2. The process of regenerating spent filter clay, comprising washing the clay with an organic solvent to remove the adhering oil, sweeping the clay with an inert water-free gas to remove said solvent therefrom and leave the clay in a dry, water-free condition, and subsequently extracting the clay with a revivifying solvent.

3. The process of claim 1 wherein refinery gas is used to remove the solvent from the clay.

4. The process of claim 1 wherein combustion products are used to remove the solvent from the clay.

5. The process of claim 2 wherein refinery gas is used to remove the solvent from the clay.

6. The process of claim 2 wherein combustion products are used to remove the solvent from the clay.

NORMAN E. LEMMON.
ARTHUR B. BROWN.